May 13, 1952 J. HALAHAN ET AL 2,596,680
THERMOSEALING ATTACHMENT
Filed Aug. 18, 1950

INVENTORS.
JOHN HALAHAN
THEODORE F. ARONSON
FLOYD A. LYON
BY
ATTORNEY.

Patented May 13, 1952

2,596,680

UNITED STATES PATENT OFFICE 2,596,680

THERMOSEALING ATTACHMENT

John Halahan, Jackson Heights, Theodore F. Aronson, Valley Stream, and Floyd A. Lyon, Brookville, N. Y., assignors to Berlin & Jones Co., Inc., New York, N. Y., a corporation of New York Application August 18, 1950, Serial No. 180,146

4 Claims. (Cl. 219—19)

This invention relates to new and useful improvements in thermo-sealing units and particularly sealing units for banding machines.

In our copending applications for an Envelope Banding Machine, Serial No. 95,076, filed May 24, 1949 and Feeding and Banding Machine, Serial No. 127,642, filed November 16, 1949, a machine is described in which paper tape is formed into a band around a bunch of envelopes. The ends of the band overlap and are secured to one another by a stapling device, e. g. a Bostitch stapler. The speed of operation of this stapling mechanism is an important limiting factor in the speed at which the banding machine can operate.

The object of the present invention is to achieve certain improvements in the machine described in the copending applications and particularly to permit its more rapid operation.

According to a feature of the present invention a thermo-sealing unit is substituted in the banding machine for the stapler. The paper tape used for the band; has a thermo-plastic coating on one side and the overlapped ends of the band are stuck to one another by operation of the sealing unit.

The sealing unit is inexpensive and comprises relatively few and simple parts and when substituted for the stapling mechanism in a banding machine will materially increase the speed of operation of the machine and its efficiency.

The invention will be better understood from the following detailed description taken in connection with the accompanying drawings, in which.

Figure 1:
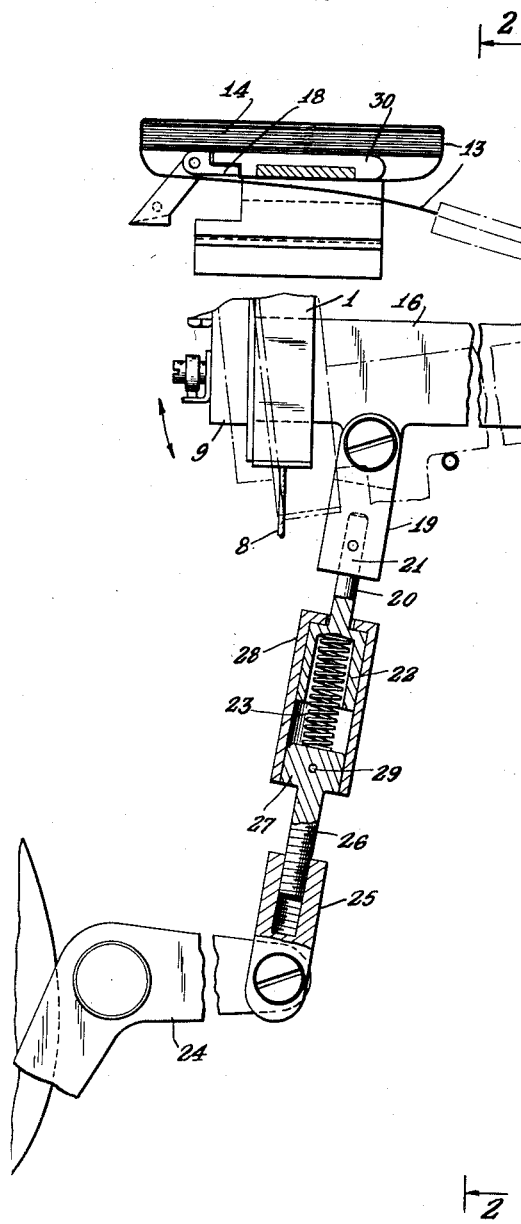
Fig. 1 is a side elevation partly in section of the operating mechanism.
Figure 2:
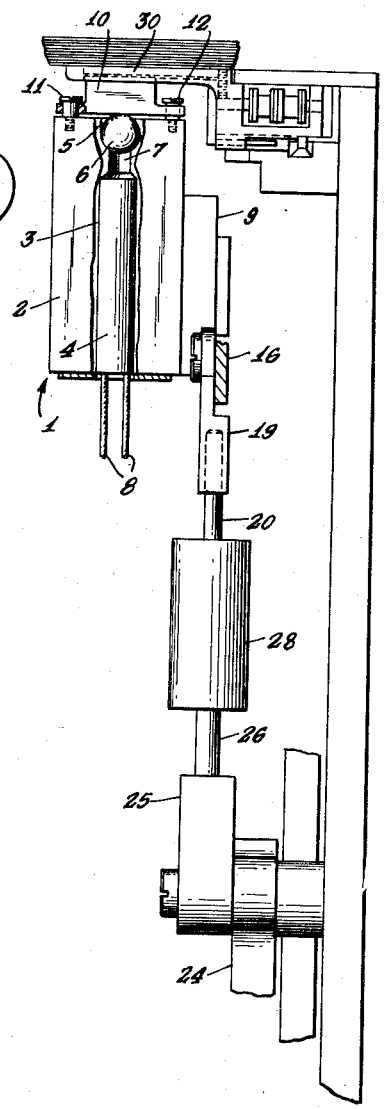
Fig. 2 shows in greater detail the thermo-sealing unit.

A thermo-sealing head 1 comprising an outer block portion 2 made from any good conductor, e. g. aluminum, has a cut-out portion 3 for accommodating a heater cartridge 4. The top center of block 2 is provided with a suitable recess 5 for a spherical ball 6 of steel or the like. Between the bottom of ball 6 and the top of cartridge 4, there is provided an empty chamber 7.

Cartridge 4 is heated by means of electrical leads 8, which are connected to a suitable source of power. A thermostat 9 fastened to the side of block 2 controls in the well-known manner the amount of heat given off by the heater cartridge.

A heating platen 10 of suitable conducting material, e. g. aluminum, is movably connected to the top of block 2 by shouldered screws 11—12.

Ball 6 is positioned in its recess so as to protrude a small distance above the surface of block 2, for example, $\frac{1}{32}$ of an inch, so as to make a rolling contact with the bottom of the platen 10. Platen 10 is heated from cartridge 4 via ball 6, and by convection and radiation from the upper surface of block 2.

Paper tape 13 (Fig. 1) which is used to form bands around bunches of envelopes 14, is thermo-plastically treated on one side so that it becomes tacky when heated. As disclosed in our copending applications and generally indicated at 15, a pawl and guideway arrangement is used to guide tape 13 into a clamp mechanism generally indicated at 18 which carries the tape around the envelopes.

Sealing head 1 is secured to one end of an arm 16 (Fig. 1) which is pivotally connected at 17 to a side of the existing machinery. Connected to a depending ear of arm 16 is a tie rod end 19 and a resilient linkage arrangement comprising a member 20 having one end 21 connected to the tie rod end 19 and the other end 22 adapted to surround part of a spring 23. Pivotally connected to a follower arm 24, and more fully illustrated in the copending applications, is a tapped female link 25 to which a male link 26 is attached. Upper portion 27 of male link 26 has approximately the same outside diameter as member 22. Spring 23 is held between members 27 and 22. A housing 28 and pin 29 secure members 22 and 27.

A second platen 30, also part of the banding mechanism illustrated in our copending applications, cooperates by acting as a top for the upward movement of heating platen 10.

The resilient mounting for the thermo-sealing head is employed to provide the proper impact between the heating platen 10 and upper platen 30.

The operation of the device may be described as follows:

The pawl and guideway in the banding machine feeds one end of the tape to the clamp which carries it around the envelopes to form a band with a short overlapping of the ends, as described in the aforementioned copending applications. As soon as the overlapping tape ends appear between the heating and upper platens, follower arm 24 is operated and the thermo-sealing unit is briefly raised (Fig. 1, solid lines) so that heating platen 10 contacts the tape ends rendering them tacky and sticking them to one another. The type of thermo-plastic material used and the degree of heat transferred to platen 10 should be such as to insure sticking of the two tape ends to one another without the necessity of their being pressed against upper platen 30. The movable way in which platen 10 is mounted also permits it to accommodate itself to any position of the tape and thereby insures proper sealing of the ends. The time during which heat is applied to perform the sealing operation is so brief that the speed of operation of the banding machine may be materially increased over the speed of the machine when a stapler was used to fasten the ends of the tape together.

Although the preferred embodiment has been described, it should be borne in mind that modifications may be made without departing from the scope of the invention. For example, the upper and heating platens may be made of different materials and have different surface profiles, such as a waffle or perforated profile.

What is claimed is:

1. A thermo-sealing unit of the type described adapted to stick together the ends of a band of thermoplastically treated tape comprising: a supporting block, a heater cartridge in said block, means for heating said cartridge, a heating platen on said block, a ball positioned in a recess in the top surface of said block for transferring heat from the cartridge to said heating platen, and means for contacting the ends of said tape with said heating platen to seal them to one another.

2. The device according to claim 1, and in which a second platen is positioned above said heating platen whereby the ends of the band of tape are pressed between said two platens.

3. A thermo-sealing unit for an envelope banding machine in which paper tape, one of whose sides has been thermo-plastically treated, is formed into bands around bunches of envelopes comprising: a metal supporting block, a heater cartridge in said block, electrical connections for heating said cartridge, a spherical metal ball in a recess in the top portion of said block and positioned in the recess so that the ball protrudes slightly above the surface of the block, a heating platen movably attached to said block and contacting said ball, a thermostat for controlling the heat in said cartridge, and a cyclically operable means for moving said platen to contact the ends of said tape to seal them to each other.

4. A thermo-sealing unit for an envelope banding machine in which paper tape, one of whose sides has been thermo-plastically treated, is formed into bands around bunches of envelopes comprising: a metal supporting block, a heater cartridge in said block, electrical connections for heating said cartridge, a spherical metal ball in a recess in the top portion of said block and positioned in the recess so that the ball protrudes slightly above the surface of the block, a chamber connecting the heater cartridge and said ball, a heating platen movably attached to said block and contacting said ball, a thermostat for controlling the heat in said cartridge, a second platen positioned above said heating platen, cyclically operable means for moving said thermo-sealing unit, a resilient connection between said cyclical means and said unit whereby the unit is periodically raised when the ends of said tape are between the heating platen and said second platen to seal said ends to each other.

JOHN HALAHAN.
THEODORE F. ARONSON.
FLOYD A. LYON.

REFERENCES CITED

The following references are of record in the file of this patent:

UNITED STATES PATENTS

| Number | Name | Date |
| --- | --- | --- |
| 1,997,268 | Scharpf | Apr. 9, 1935 |
| 2,227,497 | Hallman | Jan. 7, 1941 |
| 2,414,157 | Marziani | Jan. 14, 1947 |
| 2,433,176 | Van Epps et al. | Dec. 23, 1947 |
| 2,452,126 | Irwin, Jr. | Oct. 26, 1943 |
| 2,466,802 | Fossa et al. | Apr. 12, 1949 |
| 2,494,905 | Shumann | Jan. 17, 1950 |
| 2,514,197 | Groten et al. | July 4, 1950 |